March 27, 1934.   J. FLAMMANG ET AL   1,952,202
WRIST PIN LOCK
Filed Oct. 13, 1932

Inventors:
John Flammang, Percy L. Bowser & Hernan Ernst,
Their Attorney.

Patented Mar. 27, 1934

1,952,202

UNITED STATES PATENT OFFICE 1,952,202

WRIST PIN LOCK

John Flammang, University City, Percy L. Bowser, St. Louis, and Herman Ernst, Pine Lawn, Mo., assignors to The Stirling Corporation, St. Louis, Mo., a corporation of Delaware Application October 13, 1932, Serial No. 637,580

11 Claims. (Cl. 309—19)

This invention pertains to locking devices, and more particularly to means for locking a wrist pin in a piston so as to secure the same against end play.

One of the objects of this invention is to provide a locking device of simplified structure which will retain the wrist pin in place and which may easily be manipulated so as to release the pin for removal.

Another object is to provide a device of this kind which will take up the minimum of space.

Another object is to provide such a device which will interfere to a minimum extent with the bearing of the wrist pin in the piston boss, or in the connecting rod.

Another object is to provide such a device which when locked will be perfectly secured against accidental unlocking.

Further objects will appear from the following description taken in connection with the following drawing, in which.

Figure 1:
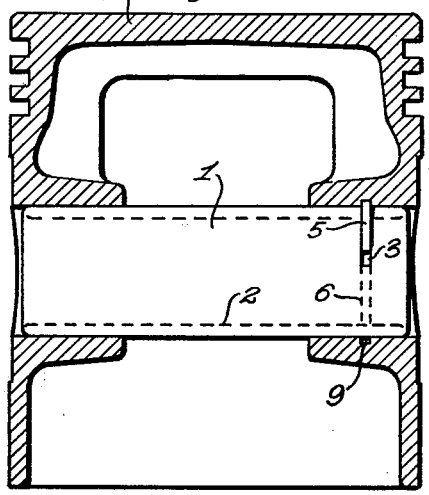
Figure 1 is a sectional view showing a wrist pin in the piston boss and the manner of application of the locking device in accordance with this invention.
Figure 3:
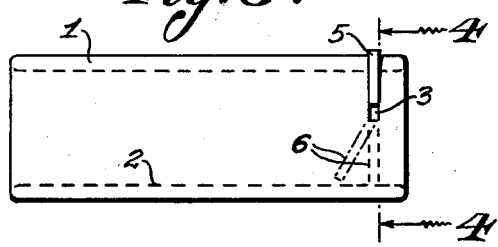
Figure 3 is a side view of a hollow wrist pin showing a locking device applied in accordance with this invention.
Figure 4:
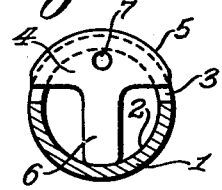
Figure 4 is a section on line 4—4 of Figure 3.

Referring now to the drawing and more particularly to Figures 3 and 4, 1 designates a wrist pin of the ordinary type. This pin may be provided with a bore 2 as is customary for such pins are usually made hollow. The pin 1 is provided at a suitable point along its length with a transverse slot 3 extending almost to its center. This slot provides a guide socket for a locking piece 4. The piece 4 is preferably flat and may be formed, for instance, by punching from sheet metal of suitable thickness or other suitable material. The body portion of the locking piece 4 is generally semi-circular in form and may be provided with a rim 5 of a radius slightly larger than that of the pin 1 and adapted to protrude outside of the pin when in locking position.

In the embodiments of Figures 3 and 4 the locking piece 4 is provided with an extension or stem 6 adapted to extend to the opposite side of the bore 2 of the wrist pin. The length of the stem 6 is so adjusted that when the locking piece is in normal position in the socket or slot 3 with the end of the stem 6 engaging the wall of the bore 2, the rim 5 will protrude slightly beyond the outer periphery of the wrist pin. The locking piece 4 is preferably constructed of relatively soft or bendable material so that the stem 6 may be bent laterally as indicated in dotted lines in Figure 3. When so deflected its radial dimension is reduced so as to permit the locking piece to be retracted in the socket 3 so as to bring the rim 5 within the outer periphery of the wrist pin. A recess or perforation or other suitable element 7 may be provided on the locking piece 4 for the engagement of an implement to assist in retracting the locking piece when desired.

Referring now to Figure 1 the piston 8 to which the wrist pin 1 is to be applied is provided with an annular groove 9 on the interior of the wrist pin bearing. This groove is suitably located to match the location of a socket 3 in the wrist pin so that when these recesses are brought into registry with each other the wrist pin will be properly located in the piston with its ends clear of the cylinder wall. The locking piece 4 is first inserted in the wrist pin with the stem 6 bent laterally so as to permit retraction of the locking piece as described. With the locking piece in retracted position the pin is inserted in the wrist pin bearings and moved so as to bring the socket 3 into registry with the annular groove 9 in the pin boss. When such registry has been effected the locking piece 4 is moved outwardly so that the rim portion 5 will enter the groove 9. A suitable tool may now be inserted through the bore 2 so as to straighten the stem 6 to its normal position in the same plane as the body portion of the locking piece 4. This not only forces the locking piece into the groove 9 but the stem 6 maintains it in this position so that the wrist pin is permanently locked in the piston.

Figure 2:
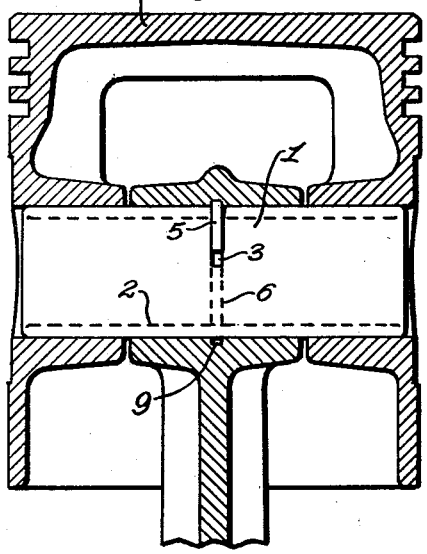
Figure 2 is a similar view showing the device applied to lock the wrist pin in the connecting rod.

In Figure 2 a similar construction is illustrated except that the groove 9 is formed in the bearing of the connecting rod instead of in the wrist pin boss. In this case the wrist pin is locked in the connecting rod instead of in the piston. In either case it is locked against endwise movement and can not, therefore, come into contact with the cylinder wall.

Figure 5:
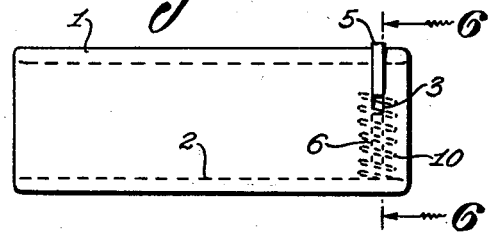
Figures 5 and 6 are views similar to Figures 3 and 4 respectively illustrating another embodiment of this invention.
Figure 6:
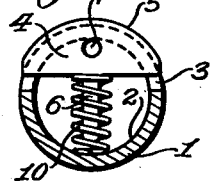
Figure 7:
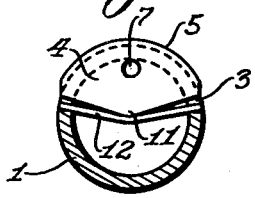
Figure 7 is a sectional view similar to Figure 6 illustrating still another embodiment of this invention.

In the embodiments of Figures 5 and 6 the stem 6 is made somewhat shorter than in Figures 3 and 4 and has mounted thereon a suitable compression spring 10 tending to force the locking piece outwardly. This device is applied to the piston by inserting a pin with the locking piece retracted against the pressure of the spring 10 and held retracted until the same passes into the wrist pin bearing. If the pin is then moved so as to bring the socket 3 into registry with the groove 9 the locking piece will snap into said groove in response to the pressure of the spring 10. In Figure 7 instead of a pronounced stem the locking piece 4 is provided with a downward projection 11 adapted to engage a spring 12 of the flat leaf type whose ends are arranged to rest on the bottom of the groove 3. The spring 12 also urges the locking piece outwardly so as to cause it to snap into the groove 9 as already explained.

It will be seen that this invention provides a locking device of very simple design and of a minimum cost. It is not only certain in its action, but it takes up very little room so that the amount of the wrist pin bearing surface which is sacrificed to provide such a locking feature is reduced to a minimum. The pin is not only locked in the piston, but may easily and quickly be removed therefrom. In the embodiment of Figures 3 and 4 it is only necessary to bend the stem 6 to one side and then insert a suitable implement in the recess 7 to retract the locking piece and remove the pin. The other embodiments are similarly manipulated.

While this invention has been described as including the locking piece, the wrist pin and the piston on a unitary structure, it will be understood, of course, that individual features and sub-combinations may be useful without reference to the rest of the general combination. It is understood, therefore, that the employment of such individual features and sub-combinations is contemplated by this invention and within the scope of the appended claims.

It is further obvious that various changes may be made, within the scope of the appended claims, in the details of construction without departing from the spirit of this invention; it is to be understood, therfore, that this invention is not limited to the specific details shown and described.

Having thus described the invention, what is claimed is:

1. In combination with a wrist pin having a socket, a lock whose body is adapted for permanent deformation to extend and contract the same in said socket, said lock having a locking portion projectable beyond said socket when the body is extended.

2. In combination with a wrist pin having a socket, a lock having a body adapted for non-resilient extension and contraction in said socket, means for maintaining said body in extended position, and means for retracting said body.

3. In combination with a hollow wrist pin having a relatively narrow transverse slot providing a socket, a locking piece having a relatively thin flat body adapted to be guided in said socket and an arcuate rim, and means for maintaining said body in extended position in said socket with its rim protruding from the socket.

4. In combination with a hollow wrist pin having a transverse slot providing a socket, a locking piece having a flat body adapted to be guided in said socket, and a non-resilient bendable extension on said body adapted when bent to permit retraction of said body and when straightened to support said body in locking position.

5. In combination with a hollow wrist pin having a transverse slot providing a socket, a locking piece having a flat body adapted to be guided in said socket, and a non-resilient bendable stem extending inwardly of the pin adapted when bent to permit retraction of said body and when straightened to engage the inner wall of the pin to maintain said body in locking position.

6. In combination with a wrist pin having a socket, a locking piece carried by said pin and guided in said socket and having non-resilient means adapted for manipulation to contract and extend said locking piece.

7. In combination with a wrist pin having a socket and a bearing therefor having a socket in alinement with said pin socket, a non-resilient locking piece engageable with said alined sockets to lock said pin in its bearing, said locking piece being dimensioned to engage said bearing socket when in unbent condition and being bendable to reduce its extent in order to disengage the bearing socket.

8. In combination with a hollow wrist pin having a transverse slot providing a socket, a locking piece comprising a flat plate guided in said socket and having an arcuate rim positioned to protrude beyond and extend around the circumference of the pin when in extended position, and means for contracting and extending said locking piece.

9. A pin lock, comprising, a flat plate having an arcuate circumferential locking edge, and means for extending and contracting said plate.

10. In combination with a wrist pin having a socket, a non-resilient deformable locking piece guided in said socket.

11. In combination with a wrist pin having a transverse slot providing a socket, a flat plate having an arcuate circumferential locking edge guided in said socket.

JOHN FLAMMANG.
PERCY L. BOWSER.
HERMAN ERNST.